Feb. 1, 1949.  F. WHITE  2,460,557
CONVERTIBLE CHILD'S SEAT AND CAR
Filed April 25, 1945
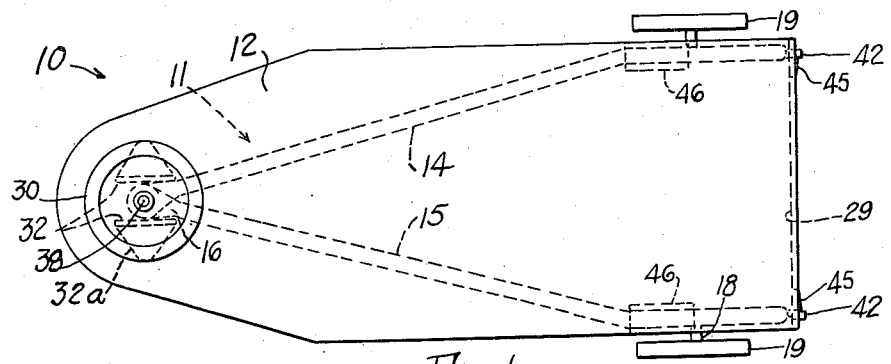
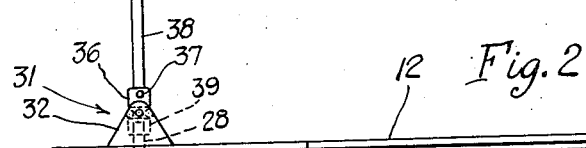
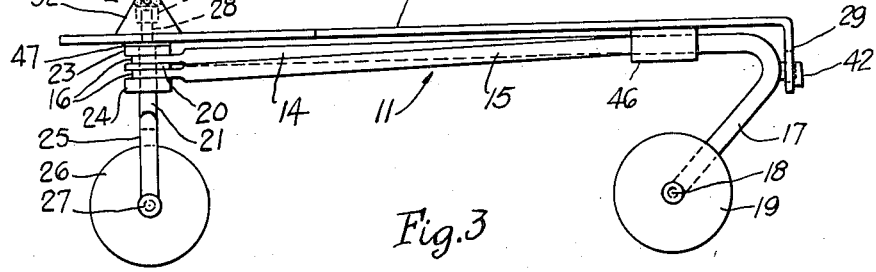
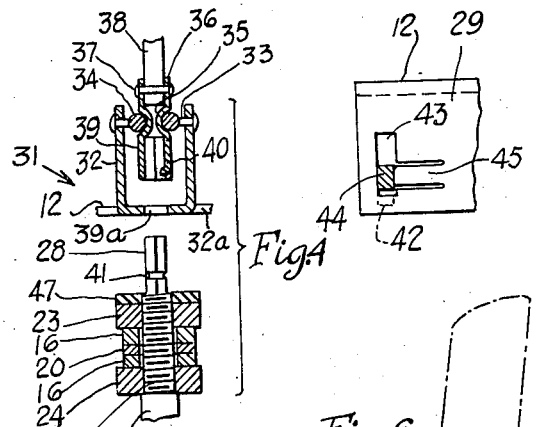
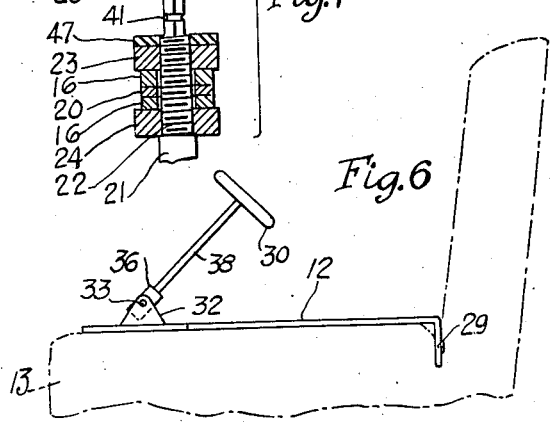
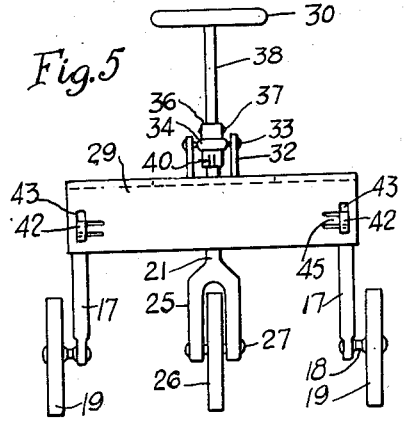
Florence White INVENTOR.
BY Iris Shumacher, Atty.

Patented Feb. 1, 1949

2,460,557

UNITED STATES PATENT OFFICE 2,460,557

CONVERTIBLE CHILD'S SEAT AND CAR

Florence White, Bound Brook, N. J.

Application April 25, 1945, Serial No. 590,232

18 Claims. (Cl. 280—30)

This invention relates to appliances for children, and has particular reference to children's cars and seats.

One object of the invention is to provide a child's convertible car and seat having improved means whereby the seat can be embodied as a part of the car or separately employed, preferably on a seat cushion of an automobile to safely retain and amuse a child.

Another object of the invention is the provision of a child's seat removably engageable in a very simple manner with a fixed seat cushion and adapted to cooperate with a collapsible child's car frame to form the seat of the car and to directly engage and prevent collapse of the frame without requiring latches or other special securing devices, the seat being adapted to be directly lifted out for use on an automobile and for collapsing of the frame of the child's car.

Another object of the invention is to provide an improved collapsible child's car, particularly of the tricycle type.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view of a convertible child's car and seat embodying the invention.

Fig. 2 is a view in side elevation thereof.

Fig. 3 is an enlarged fragmentary view of a rear portion of the child's car, with a part in section and a part shown in dot-dash lines.

Fig. 4 is an exploded, fragmentary, sectional view of the detachable steering wheel mechanism.

Fig. 5 is a view in rear elevation of the child's car.

Fig. 6 is a view in side elevation of the detached child's car seat mounted on an automobile seat shown in dot-dash lines, according to the invention.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes a convertible child's seat and car embodying the invention. The same may include a frame 11 so constructed as to be collapsible, and being held against collapsing by cooperation with a removable seat 12. When the seat is removed it may be used as a portable support for a child, and for this purpose may be placed on an automobile seat or cushion 13 which it may engage by suitable means hereinafter described.

A preferred collapsible frame may comprise a plurality of side members or bars 14, 15 that may consist of metallic tubing, or other suitable material. These bars may be substantially identical so that any bar can be used as a right or left member subject only to minor changes. At its forward end, each bar may have an integral eye portion 16. At its rear end, each bar may have wheel supporting means such as a downwardly and forwardly bent portion 17 having at its free end a stub shaft 18 riveted thereto or journaled therein and mounting a wheel 19. The bars 14, 15 are disposed so that their eyes 16 are in superposed alined relation, whereby the bars 14, 15 are at an angle to each other vertically, and therefore the portions 17 may be slightly differently bent to bring the rear wheels 19 into alinement with each other. For clearance between the bars, a washer 20 may be placed between the eyes 16. Interconnecting the latter is a vertical shaft 21 having securing means such as a threaded portion 22 and nuts 23, 24 respectively above and below the eyes to prevent separation of the same. These nuts permit free rotation of the shaft 21 and hence the nuts are secured in place as by utilizing a tight thread. Depending from the shaft 21 is a fork 25 carrying a wheel 26 in suitably journaled relation at 27. From the upper end of the shaft there projects an integral engagement trunnion 28 for a steering device hereinafter described.

As thus far described, it will be perceived that I have provided a tricycle wheeled frame which normally forms a triangle, but which may be collapsed by angular movement of the side bars 15, 14 toward each other about a single point of interconnection afforded by a steering post for the tricycle.

The seat 12 may include a plate of rigid material, preferably metal, having at its rear end a downwardly bent flange 29. The latter has the dual function of engaging back of the cushion 13 of an automobile seat, and of engaging the frame 11 to prevent collapse thereof when associated with the frame. The flange also stiffens the seat transversely. The forward end portion of the seat may be tapered and may carry a decorative element such as a steering wheel 30 adapted to be held by the child for its amusement and support when seated in an automobile and for steering the tricycle when seated on the latter. Means 31 is provided for mounting the steering wheel to accomplish these purposes, and also to permit the steering wheel to swing rearwardly when the seat is used in an automobile. The means 31 may include a bracket formed, for example, of parallel wings 32 struck out of the seat 12 and bent upwardly to lie along planes longitudinal of the seat, the resultant opening in the seat being shown at 32a. Journaled on these wings are opposed, alined pins or stub shafts 33 carrying therebetween a ring or gimbal 34. The latter forms a bearing around the neck 35 of a tubular element 36 in which is pinned at 37 a rod 38 carrying the steering wheel 30. A depending portion 39 of the rotatable member 36 is deformed into flat or polygonal shape in cross-section for non-rotatable engagement with the similarly shaped member 28 which it is adapted to receive. In its vertical position, the socket 39 alines with an opening 39a in the seat, through which opening the element 28 may enter the socket. In other words, the part 39 engages the member 28 in the manner of a socket wrench. If desired, engagement means may be provided to prevent accidental separation of the members 36 and 28 as by using a spring snap means including a resilient tongue 40 longitudinally cut in the part 39 and headed to engage in an annular groove 41 of the member 28. The securement of the seat 12 to the frame is also effected by detachably interengaging portions including hook means, such as one or more hooks 42 secured to the individual bars 14, 15 adjacent to the bight of each, these hooks opening downwardly, and portions in the flange 29 having elongated openings 43 to freely receive the hooks. The shanks 44 of the hooks are adjacent to the bottom edges of the openings, since the seat 12 is pivoted downwardly about the hooks for sleeving the member 36 over the element 28, with the seat bearing down on the bight portions of the bars 14, 15. Preferably, the hooks are positioned relatively low to cause the flange 29 to suitably stiffen the frame.

To prevent lateral vibration, a spring tongue 45 may be provided at a side of each opening 43, with the free end bearing against the hook shanks 44. To avoid vertical vibration, rubber or canvas tubes or rings 46 may be sleeved over the bars 14, 15 to carry the rear part of the seat 12, while the front part may rest on a rubber or canvas washer 47 lying on the nut 23.

The manner of using the device 10 will now be briefly described. It has the double purpose of affording a device which can be used in an automobile to amuse and safely support a child. Thus the seat 12 is fixed by the flange 29 engaging the rear edge of the seat cushion 13. The child may amuse itself by turning the steering wheel, which also affords a hand hold so that the child will not fall off the seat. The steering wheel in convenient of access as it may swing rearwardly.

When the car 10 is to be used, the seat 12 is engaged with the frame 11 by first entering the hooks 42 into the holes 43 and swinging the seat downwardly to cause the tubular part 39 to receive the trunnion 28. As this occurs, the seat pivots on the hooks and then on the cushions 46 so that the hooks are at the lower ends of the openings 43 and are engaged by the vibration damping springs 45. There is sufficient clearance in the device 10 to permit the parts 39 and 28 to easily aline with each other, and as the seat 12 comes to rest on the cushion washer 47, the spring snap engagement 40, 41 becomes effective. However, this may be omitted, since the weight of the seat will suffice to prevent accidental separation of those parts. Now the axis of the steering wheel is maintained vertical as it is coupled to the shaft 21, and yet the steering wheel may be turned to rotate the coupling 36 in its gimbal 34 and thus to turn the wheel 26 for steering the car.

When thus assembled, the device 10 can be operated like any three wheeled child's car. The flange 29 with the side bars 14, 15 provides a triangular frame which is rigid and yet affords sufficient yield for bumps in the road. Thus the wheels 19 may be at slightly different elevations because of irregularities in the street and the frame will readily yield to conform, without causing undue strain or vibration.

When only the seat is used, the frame 11 may be collapsed by swinging the bars 14, 15 together, whereupon the frame may be readily stored away in the automobile. Thus a child may be amused while traveling, with the steering wheel 30 at a convenient angle, and upon arrival at the destination, the car can be instantly assembled and made available for use by the child. When the seat is to be stored away, the steering wheel 30 may be swung downward all the way for compactness. In swinging the members 14, 15 toward each other, they partially override each other due to the spacing of the washer and because of a slight yield or resilience in the members.

I claim:

1. A child's car comprising a frame structure having parts swingably interconnected so that said frame structure is collapsible, and a removable seat, said seat, when removed from the child's car, being adapted to be positioned on an automobile seat cushion and having a rear end portion releasably engageable with an edge of the cushion to retain the seat in position, said removable seat having portions including said rear end portion adapted to engage said parts of the child's car to prevent swinging movement of said parts and to cause rigidity of the frame structure.

2. A child's car comprising a frame having side members pivotally interconnected so that the frame is collapsible, the car having a seat that is removable to permit the frame to freely collapse, said seat being of rigid construction and having means including marginal portions engaging said members to thus prevent relative angular movement between the members and maintain the frame against collapsing, said seat having secured to its front portion a decorative element adapted to be grasped by the child for its support, said seat, when separated from the car, being adapted to serve as a portable seat and decorative element unit.

3. A child's car comprising a frame, including parts swingably interconnected at the front end of the frame for collapsibility of the frame, and a removable, one-piece rigid seat resting on said parts and engaging certain of said parts to prevent swinging movement and collapsing of the frame, whereby the seat is adapted to form a portable independent support for a child, and the seat and said parts having detachably interengaging means and to hold the seat in position and to cause the latter to prevent collapse of the frame.

4. A child's car comprising a frame having side members swingably interconnected, said frame having engagement portions, and an elongated removable, portable rigid seat resting on said parts and having at its rear a downwardly projecting rigid flange, and the seat having means, including said flange, detachably engaging said portions of the side members to prevent relative movement of the seat and to prevent swinging movement of said members and collapsing of the car, the removed seat being adapted to rest on an automobile seat cushion with said flange engaging the rear edge of the cushion.

5. A child's car including a rigid, removable, portable child's seat having at the rear thereof a downwardly projecting flange adapted to engage the rear edge of an automobile cushion on which the seat is adapted to rest, a collapsible frame comprising side bars swingably interconnected at the front end of the frame, the latter being adapted to removably receive and support the seat, and the flange and frame having portions detachably interengaging the flange and frame to prevent swinging movement of the side bars and thus to avoid collapse of the frame.

6. A child's car according to claim 5 wherein the detachably interengaging portions include a lateral downwardly opening hook on the frame and a portion on the flange engageable under the hook as the seat is moved downwardly to rest on the frame.

7. A child's car according to claim 5 wherein the car includes a front wheel for turning the same, and means for mounting the wheel on the frame, a steering member, means for mounting the same on the seat to form a removable unit with the latter, and means for detachably interengaging the wheel mounting means and the steering member when the seat is mounted on the frame so that the steering member is adapted to actuate the wheel to turn the car.

8. A child's car comprising a frame, a removable seat detachably carried by the frame, a front wheel for turning the car, means for mounting the wheel on the frame for steering about an upright axis, a steering member for the wheel, means for mounting the steering member on the seat for removal as a unit therewith, and means for detachably axially interengaging the steering member with the wheel mounting means for controlling the turning of the car.

9. A child's car having a frame, a wheel for turning the car, means for mounting the wheel on the frame, a seat detachably engaging with the frame and having a rear depending flange adapted to engage the rear edge of a support on which the removed seat can rest, a steering member, means mounting the latter on the seat for removal as a unit with the seat, and means interengaging the steering member with the wheel mounting means upon mounting the seat on the frame, the frame having portions engaging the flange to detachably secure the seat to the frame, and the interengaging means being disengageable for separation of the steering member from the wheel mounting means upon removal of the seat from the frame.

10. A child's car having a frame and a front wheel for steering the car, the frame comprising side frame elements pivotally interengaged at the front end for angular movement between each other to collapse the frame, a first means mounting the wheel on the frame, a removable seat, a steering member for said wheel, a second means mounting the steering member on the seat for removal as a unit therewith, said second means being detachably connected to said first means for operative engagement with the steering member, and a third means carried by the seat detachably connecting the latter to the frame, said third means being so constructed and arranged to retain the seat in operative position on the frame and to prevent angular movement between the frame elements.

11. The child's car defined in claim 10 wherein the first means includes a pivotal connection between said frame elements.

12. The child's car as defined in claim 10 in which the second means includes means for rotatably and swingably mounting said steering member.

13. The child's car as defined in claim 10 in which said second means includes means comprising a gimbal ring, a member swingably mounting said gimbal ring, and a member journaled in the ring carrying the steering member whereby the latter can be swung as well as rotated when the seat is removed from the frame.

14. The child's car as defined in claim 10 in which said third means includes a rear depending flange on the seat, said flange engaging the rear end portions of said frame elements.

15. The child's car as defined in claim 10 in which said third means includes a rear depending flange on the seat, the frame elements having hooks on their rear ends, and the flange having openings to receive the hooks.

16. The child's car as defined in claim 10 in which said third means includes a rear flange, the frame elements having rigid hooks on their rear ends, the flange having openings to receive the hooks and having springs bearing laterally on the hooks to dampen vibrations.

17. A child's car having a frame and a front wheel for steering the car, the frame comprising side frame elements pivotally interengaged at the front end for angular movement toward each other to collapse the frame, a first means mounting the wheel on the frame, a removable seat, a steering member for said wheel, a second means mounting the steering member on the seat for removal as a unit therewith, said first means including a pivotal connection between said frame elements, male and female axially interengaging members detachably connecting said first means to said steering member, said second means including a gimbal mounting for one of the interengaging members permitting swinging of the steering member when the male and female members are disengaged, and a third means carried by the seat detachably connecting the latter to the frame, said third means being so constructed and arranged to retain the seat in operative position on the frame and to prevent angular movement between the frame elements.

18. A child's car having a frame and a wheel for steering the car, a first means mounting the wheel on the frame, said first means including an upright shaft portion, a removable seat on the frame, an upright steering member for the wheel, a second means mounting said steering member on the seat for removal as a unit therewith, said second means including an element swingable about a horizontal axis and rotatably carrying the steering member in upright position, said steering member and first means upright shaft portion being releasably interconnected in axial relation in said upright position.

FLORENCE WHITE.

REFERENCES CITED

The following references are of record in the file of this patent:

UNITED STATES PATENTS

| Number | Name | Date |
| --- | --- | --- |
| 1,269,260 | Converse | June 11, 1918 |
| 1,331,072 | Longfellow | Feb. 17, 1920 |
| 1,444,295 | Wynne | Feb. 6, 1923 |
| 1,472,611 | Mettler | Oct. 30, 1923 |
| 1,693,633 | Allen | Dec. 4, 1928 |